US008745605B2

(12) United States Patent
Stall et al.

(10) Patent No.: US 8,745,605 B2
(45) Date of Patent: Jun. 3, 2014

(54) EXECUTION CONTEXTS WITH POLYMORPHIC TYPE IMPLEMENTATIONS

(75) Inventors: Jonathon Michael Stall, Bothell, WA (US); Renaud Paquay, Redmond, WA (US); Sonja Keserovic, Kirkland, WA (US); Michael Gregory Montwill, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1188 days.

(21) Appl. No.: 12/351,450

(22) Filed: Jan. 9, 2009

(65) Prior Publication Data

US 2010/0180269 A1 Jul. 15, 2010

(51) Int. Cl.
*G06F 9/45* (2006.01)
(52) U.S. Cl.
CPC . *G06F 8/443* (2013.01); *G06F 8/47* (2013.01); *G06F 8/41* (2013.01); *G06F 8/43* (2013.01)
USPC ........... 717/151; 717/101; 717/147; 717/141; 717/154; 717/162
(58) Field of Classification Search
CPC ....... G06F 8/443; G06F 9/44521; G06F 8/47; G06F 8/41; G06Q 10/06
USPC .......................................... 717/147, 168–178
See application file for complete search history.

(56) References Cited

U.S. PATENT DOCUMENTS

| 6,134,559 | A | 10/2000 | Brumme et al. | |
|---|---|---|---|---|
| 6,499,064 | B1 * | 12/2002 | Carlson et al. | 719/316 |
| 6,553,384 | B1 * | 4/2003 | Frey et al. | 1/1 |
| 6,738,968 | B1 | 5/2004 | Bosworth et al. | |
| 7,149,878 | B1 * | 12/2006 | Jensen et al. | 712/209 |
| 7,389,498 | B2 | 6/2008 | Meijer et al. | |
| 2005/0015748 | A1 | 1/2005 | Zatloukal | |
| 2005/0235250 | A1 | 10/2005 | Rajagopal et al. | |
| 2005/0246716 | A1 * | 11/2005 | Smith et al. | 719/315 |
| 2006/0150172 | A1 * | 7/2006 | Heath et al. | 717/162 |
| 2007/0038978 | A1 | 2/2007 | Meijer et al. | |
| 2010/0153693 | A1 * | 6/2010 | Stall et al. | 712/229 |

OTHER PUBLICATIONS

Coulson et al., A Generic Component Model for Building System Software, ACM Transactions on Computer System, vol. 26, No. 1, Article 1, Publication datae: Feb. 2008.*
Kristensen et al, The When, Why and Why Not of the BETA Programming Language, 2007 Article.*

(Continued)

*Primary Examiner* — Lewis A Bullock, Jr.
*Assistant Examiner* — Tina Huynh
(74) *Attorney, Agent, or Firm* — Kevin Sullivan; Kate Drakos; Micky Minhas

(57) ABSTRACT

Various domains may wish to specify different implementations of the type; e.g., a compilation domain may describe the type statically, an execution domain may instantiate objects of the given type, while a debugging execution domain may associate additional debugging information such as a symbol name. This may be achieved by specifying a type implementation of a particular type within respective domains which all implement a common type interface. A type binding instruction set may then select a type implementation for the type within the target instruction set according to the domain, and may bind type instances of the type within target instruction set to the selected type implementation for the current domain. This technique yields domain-specific variance in type implementation without having to reconfigure the target instruction set or perform domain-checking logic therewithin.

20 Claims, 6 Drawing Sheets

(56) References Cited

OTHER PUBLICATIONS

Lapalme et al., Separating Modeling and Simulation Aspects in Hardware/Software Framework-Based Modeling Language, Dec. 2007.*

"A Type System for Object Models", http://sdg.csail.mit.edu/pubs/2004/typeSystem.pdf Cunningham, et al., "Universe Types for Topology and Encapsulation", http://pubs.doc.ic.ac.uk/universe-types-encapsulation/universe-types-encapsulation.pdf Lecture Notes in Computer Science, 2008, vol. 5382, Formal Methods for Components and Objects, pp. 72-112.

"Universe Type System" Retrieved: Oct. 22, 2008, JML Reference Manual: Universe Type System, Chapter 18, pp. 1-7, http://www.eecs.ucf.edu/~leavens/JML/jmlrefman/jmlrefman_18.html.

"Common Type System", Nov. 2007, .NET Framework Developer's Guide, 2 Pages, http://msdn.microsoft.com/en-us/library/zcx1eb1e.aspx.

Dietl, Werner M., "Chair of Programming Methodology", Research Project Description: Universe Type System, Feb. 16, 2008, 3 Pages, http://sct.inf.ethz.ch/research/universes/.

Dietl, et al., "2007 State of the Universe Address", Jul. 2007, pp. 34-36 http://www.cs.washington.edu/homes/wmdietl/publications/pubs/DietlMueller07c.pdf International Workshop on Aliasing, Confinement and Ownership in object-oriented programming (IWACO).

Stock, Manfred, "Universe Type System for Scala", Jan. 31, 2008, pp. 1-12 http://ms.stradax.net/Publications/uts-scala/uts-scala-usersguide.pdf.

\* cited by examiner

EXECUTION CONTEXTS WITH POLYMORPHIC TYPE IMPLEMENTATIONS

BACKGROUND

Within the field of computing, many scenarios involve the inspection of a type system in one of several domains that may differ in certain properties. These domains may provide different implementations for a common type interface. For example, a compiler may create and inspect static types at compile time. A debugger may inspect types that exist in a debuggee process. An IDE may inspect types constructed from user code fragments as the code is being developed. A native execution domain or simulator may create objects that are instances of the given types.

The code executed within such domains often involves the storing of type instances in a region of memory of the computer. The type instance may be of various types, such as a primitive type (e.g., an integer or a string); a plurality of several type instances (e.g., an array); a composite of several type instances (e.g., a structure or a class instance); or a reference to a memory location (e.g., a pointer.) The memory allocated for storing these types of type instances may also take many forms, such as a region of randomly accessible memory, a stack, a queue, and a heap.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Because different domains often represent different contexts in which the target instruction set is used, domains may instantiate, format, and use a particular type in a different manner than another domain. As a first example involving an integer, a native execution domain may generate a type instance of the integer according to the native word size of the architecture (e.g., a 64-bit integer created in a 64-bit operating environment); a managed execution domain may generate the type instance according to a format used by a runtime (e.g., a 32-bit integer created by a 32-bit runtime); and a virtual execution domain may generate the type instance according to a standard used by a virtual environment (e.g., a 16-bit integer created for use with a 16-bit virtual machine.) As a second example, a class instance generated by a native execution domain may simply comprise the class instance, while a debugging execution domain may also associate with the class instance some debugging information (e.g., a symbol name) and may substitute member functions with equivalent debugging functions, and a virtual execution domain may associate with the class instance both the logical address of the class instance in the native memory store and the logical address of the class instance in the virtual memory store of the virtual environment. A class instance generated by a compiler contains the information to statically describe this class and persist it to file.

In these and other scenarios, different domains may generate a type in different ways, even if the type is generated by the same target instruction set executing in the different domains. At some point, the computing environment may have to select a particular type implementation for the target instruction set, such as when a user or process requests information about the implementation of a particular type referenced in the target instruction set, or when the target instruction set is configured to generate a type instance of a type according to a particular type implementation (such as during compiling or at runtime.) At that time, the computing environment selects a type implementation for the type within the target instruction set, and binds the type instances of the type within the target instruction set to the selected type implementation (e.g., by displaying information for the user, by instantiating one or more type instances according to the type implementation, etc.)

Many techniques might achieve the binding of the type to the type implementation in a particular target set. In one such technique, a domain may specify an implementation of one or more types when such types are generated by the domain. When one or more type instances are to be bound to a type implementation within a target instruction set, the type implementation of the type within the domain may be consulted, and a type instance may be generated based on the type implementation within the domain. A domain may exist for compilation where types are defined statically and then persisted to storage. A type instance may then be implemented by a component that can read from the storage and implement the type interface. Domains may also be implemented as a set of runtimes configured to execute target instruction sets in various execution contexts, such as a native execution runtime, a debugging execution runtime, and a virtual execution runtime. Respective runtimes may also define one or more type implementations of a particular type used in a target instruction set; and when the target instruction set executing within a runtime generates a type instance of a particular type, the runtime may provide the type implementation of the type. In this manner, each domain may generate a different type implementation of a particular type consistent with the execution context of the domain, and this may be achieved without reconfiguring the target instruction set.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
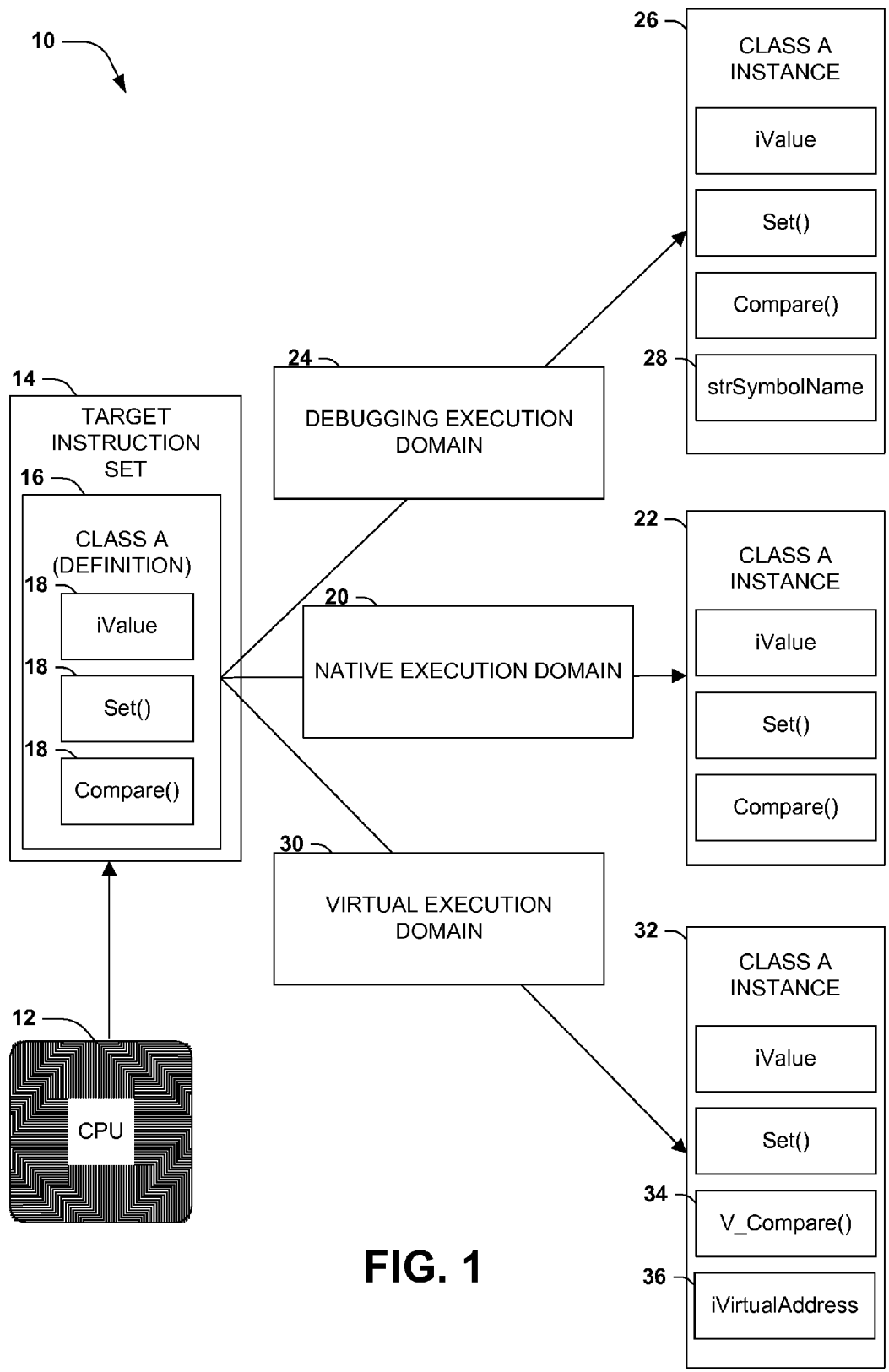
FIG. 1 is an illustration of a scenario involving the instantiation of various types in different ways on behalf of various domains.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

In the field of computing, the execution of a target instruction set (such as a program) may occur within a particular domain, which may define many aspects of the execution. Respective domains may therefore execute the target instruction set differently in furtherance of particular advantages, such as performance, safety, and inspection capabilities. For example, a first domain may be configured for natively executing a set of fully compiled instructions on the processor, which may provide high performance, but may not be amenable to oversight and may be less able to adapt to the available hardware. A second domain may be configured for executing the instructions in a debugging context, where the executing is states of particular data objects may be monitored, the occurrence of particular events may be logged, and effects may be simulated without perturbing the state of the debuggee. A third domain may be configured for executing the instructions in a virtual machine having a set of emulated hardware components and a separate memory store, which may permit execution of untrusted code without jeopardizing the local computing environment. A fourth domain may be for compilation where types are created from compiling user code and serialized to storage.

Target instruction sets often involve the generating and storing in memory of one or more values or objects, where each value or object is an instance of a particular type, such as a primitive type (e.g., integers, strings, and Boolean values), a data structure (e.g., one or more instances of a class), or a memory reference (e.g., pointers to primitive types, data structures, and functions.) The instances of such types may also be organized in memory in many ways, such as an array or linked list, a tree structure, a hashtable, a stack, etc. When a target instruction set specifies the generation of an instance of a type (such as an integer or a class), the composition of the type is identified (such as the length of an integer, or the members comprising an instance of the class), and memory may be allocated, initialized, and accessed in accordance with the composition of the type instance. As another example, a user or process may wish to inspect or compile a source code version of the contents of a target instruction set. In these and other examples, the computing environment may have to use some information about the type implementation. The computing environment may therefore have to select a particular type implementation of the type for use within the target instruction set, and may then have to bind the type instances within the target instruction set to the type (e.g., by instantiating one or more type instances according to the selected type implementation; by compiling the target instruction set to generate type instances of the type according to the selected type implementation; or by displaying information requested by a user as to the details of the selected type implementation of the type.)

Often, the target instruction set may define the format of a type, such as the precise length and format of an integer (e.g., an unsigned 64-bit integer) and the members of a class. However, a target instruction set may also leave one or more aspects of the type undefined, such as generating an integer of unspecified size or format, or by declaring an object of a variant type or according to a "duck typing" model. The particular implementation may be selected for a type within the target instruction set when one or more type instances are bound to the type; e.g., the length of the integer may be selected based on the architecture of the computing environment, and the properties of an object may be handled differently by different runtimes when bound to the type instances of the type (e.g., when the target instruction set is executed within different execution contexts.) Moreover, the execution context expressed by a domain may preferably alter the implementation of a particular type. For example, a debugging execution domain may associate a symbol name with a particular type instance for easier inspection, and may substitute one or more member functions of a class instance with equivalent functions configured to execute in a debugging domain; and a virtual execution domain may associate with a particular type instance a virtual memory address where the type instance is located within the virtual computing environment. As a result of these considerations, a type instance generated in a first domain may be differently represented than a type instance generated in a second domain. This difference may reflect a type implementation of a type in the first domain that differs from a type implementation of the same type in the second domain.

FIG. 1 illustrates an exemplary scenario 10 involving a varying instantiation of a type (in this scenario, a class identified as "Class A") by a target instruction set 14. The target instruction set 14 defines the class using a class definition 16 that specifies the number, types, and names of the members of the class, as well as its structure (e.g., the ordering of members in a serialized representation of a class instance) and other attributes of the class (e.g., the superclasses from which the class inherits, the interfaces that the class implements, and the serializability of instances of the class.) The class definition 16 in this exemplary scenario 10 specifies several class members 18, such as an integer representing a value ("iValue") of the class instance, a Set( ) function that may be invoked to set the value of the class instance, and a Compare( ) function that compares instances of the class to determine instance identity (e.g., "is the class instance called 'MyObjectA' the same class instance as the one called 'MyObjectB'?"). The target instruction set 14 also specifies at least one instantiation of the class 16, and when the target instruction set 14 is executed on a processor 12, one or more instances of the class 16 are generated in furtherance of the tasks achieved by the target instruction set 14.

The target instruction set 14 is executed by the processor 12 within one of several domains, such as a native execution domain 20, a debugging execution domain 24, and a virtual execution domain 30. Each domain represents a particular execution context in which the target instruction set 14 may be executed, and each domain may provide a particular set of advantages and disadvantages with respect to other domains (e.g., the debugging execution domain 24 may provide debugging capabilities to the executing target instruction set 14, such as inspection, breakpointing, and monitoring; the virtual execution domain 30 may permit the execution of the target instruction set 14 within a virtual machine, which may isolate the target instruction set 14 from the native computing environment as a security measure; and the native execution domain 20 may execute the target instruction set 14 more quickly but with fewer safeguards or monitoring capabilities.)

In furtherance of the capabilities of each execution context, each domain may instantiate the class 16 on behalf of the target instruction set 14 in a different way. For example, the native execution domain 20 may instantiate the class 16 on behalf of the target instruction set 14 by generating a native class instance 22 comprising only the members of the class specified in the class definition 16. Because the native execution domain 20 is configured to provide improved performance of the target instruction set 14, the native execution domain 20 may also generate the native class instance 22 with various performance improvements (e.g., by compacting the memory usage of the native class instance 22 to conserve memory or transmission bandwidth, or contrastingly by word-aligning the class members 18 of the native class instance 22 to promote quicker access to the class members 18.) By contrast, the debugging execution domain 24 may generate a debugging class instance 26 that is configured to promote the debugging capabilities of the debugging execution domain 24. For example, the debugging class instance 26 may include an additional class member 28 that identifies a symbol name assigned to the debugging class instance 26 by the target instruction set 14; this may be helpful to a developer, e.g., for identifying the debugging class instance 14 when placed on a stack during a call stack trace.) As still another contrast, the virtual execution domain 30 may generate a virtual class instance 32 that is configured to promote the virtual execution of the target instruction set 14. For example, the virtual class instance 32 may include an additional class member 36 that identifies the virtual address of the virtual class instance 32 within the memory of the virtual machine within which the target instruction set 14 executes. The virtual class instance 32 may also replace a class member with a substituted class member 34; e.g., the Compare( ) function may be replaced with a "V_Compare( )" function that compares the virtual addresses of class instances, which may be a quicker and more semantically accurate identity comparison technique when the target instruction set 14 executes within a virtual environment.

Therefore, as illustrated in FIG. 1, type instances of a type may be generated in different ways based on the nature and capabilities of the execution domain that hosts the target instruction set 14 that generates the type instances while executing on a processor 12. Such variable configuration may promote the capabilities and advantages of the execution context represented by the domain. However, it may be appreciated that the target instruction set 14 does not specify these variances in the instantiations of the type, such as might be achieved if the target instruction set 14 first determined its execution context and then selected a type implementation among a plurality of such type implementations. This checking might result in overly complicated code, and might be difficult to maintain in view of changing numbers, natures, and configurations of the domains provided within the computing environment.

Many techniques may be devised to achieve this different result, but some such techniques might be disadvantageous, undesirable, and/or unworkable. As a first example, a domain may upon encountering one or more references to a particular type in a target instruction set, reconfigure the target instruction set to generate particular instances of the type according to a particular type implementation; e.g., a debugging execution domain may insert a field into declared classes to store a symbol name string or track such information through auxiliary maps, and a virtual execution domain may redefine each instantiation of an "int" type according to the integer format of the virtual computing environment. However, such reconfiguration may be difficult, e.g., where the target instruction set is fully compiled and difficult to analyze for the instantiation of particular types. As a second example, a domain may monitor the execution of a target instruction set to identify the instantiation of particular types, and may alter the instantiation to reflect the type implementation within the domain. However, such monitoring may reduce the performance of the execution of the target instruction set and may consume significant computing resources.

An alternative technique for achieving the varying type implementation of a type with respect to a particular domain involves declaring one or more type implementations within the domain. When one or more type instances of a type within a target instruction set are to be bound to a particular type implementation, the computing environment may identify the domain for the target instruction set, may then query the domain for a type implementation of that type, and may then bind the type instances of the type within the target instruction set to the provided type implementation. If the domain specifies a type implementation of the type, a type instance may be generated and stored in memory based on the type implementation. (If the domain does not specify a type implementation of the type, the domain may be configured to produce various outcomes, such as using a default type implementation, attempting to generate a stub type implementation of the type, querying the user for a type implementation, and/or raising an exception.) In this manner, the types utilized in the target instruction set may be matched with type implementations specified in the domain for the target instruction set, thereby achieving a domain-specific variability of type implementations while economizing computing resources and promoting the performance of the execution of the target instruction set. Moreover, this manner of binding type implementations to respective types may be performed, e.g., by a type binding instruction set provided within the computing environment and configured to generate type instances on behalf of domains that define type implementations of particular types. Such a type binding instruction set may be provided, e.g., by the computing environment, such as within one or more runtimes configured to facilitate the execution of target instruction sets within the computing environment.

Figure 2:
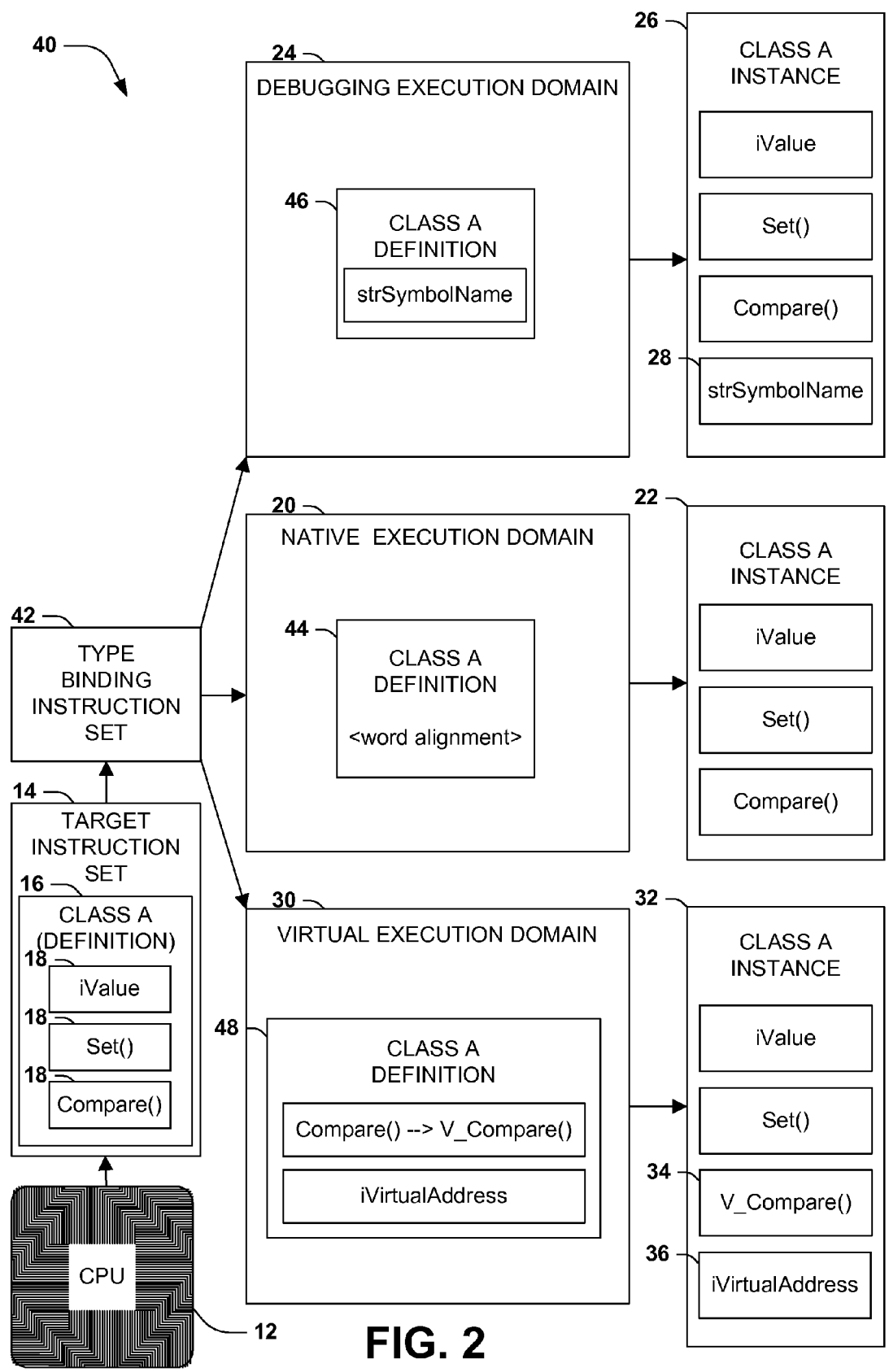
FIG. 2 is an illustration of a scenario involving the instantiation of various types in different ways according to various type implementations associated with various domains.

FIG. 2 illustrates an exemplary scenario 40 involving the association of various type implementations specified within various domains for a particular type, which may be differently instantiated during the execution of a target instruction set 14 on a processor 12. As in FIG. 1, the exemplary scenario 40 of FIG. 2 involves a target instruction set 14 having a class definition 16 comprising various class members 18, and the target instruction set 14 may be executed by a processor 12 within one of several domains, such as a native execution domain 20, a debugging execution domain 24, and a virtual execution domain 30. However, in this exemplary scenario 40, the variance in the class instances is achieved by including within each domain a class implementation that specifies a particular implementation of the class. Moreover, in this exemplary scenario 40, the class implementations are defined as alterations of the class definition 16. For example, the native execution domain 20 includes a native class implementation 44 of the class that specifies word-based alignment of the class members; the debugging execution domain 24 includes a debugging class implementation 46 that specifies the addition of the "strSymbolName" class member to instances of the class; and the virtual execution domain 30 includes a virtual class implementation 48 that specifies the addition of the "iVirtualAddress" class member and substitution of the "Compare( )" class member method with a "V_Compare( )" class member method.

As further illustrated in this exemplary scenario 40, the target instruction set 14 is serviced by a type binding instruction set 42 that binds type instances within the target instruction set 14 to a particular type implementation. For example, the type binding instruction set 42 may comprise a runtime that executes the target instruction set 14 on the processor 12, in part, by identifying the execution domain of the target instruction set 14, selecting a class implementation within the domain in which the target instruction set 14, and generating the class instance based on the selected class implementation. As another example, the type binding instruction set 42 may comprise a compiler that configures a compiled version of the target instruction set 14 to generate type instances of a type according to a particular type implementation. As a third example, the type binding instruction set 42 may comprise an instruction set inspection tool that, when applied to a particular instruction set, provides information about type instances of a type in the instruction set according to a particular type implementation. In these scenarios, the target instruction set 14 may rely on a particular implementation of respective types, based on the domain of the target instruction set 14. Moreover, this variance is achieved in the absence of domain-specific logic or a plurality of class definitions 16 in the target instruction set 14.

Figure 3:
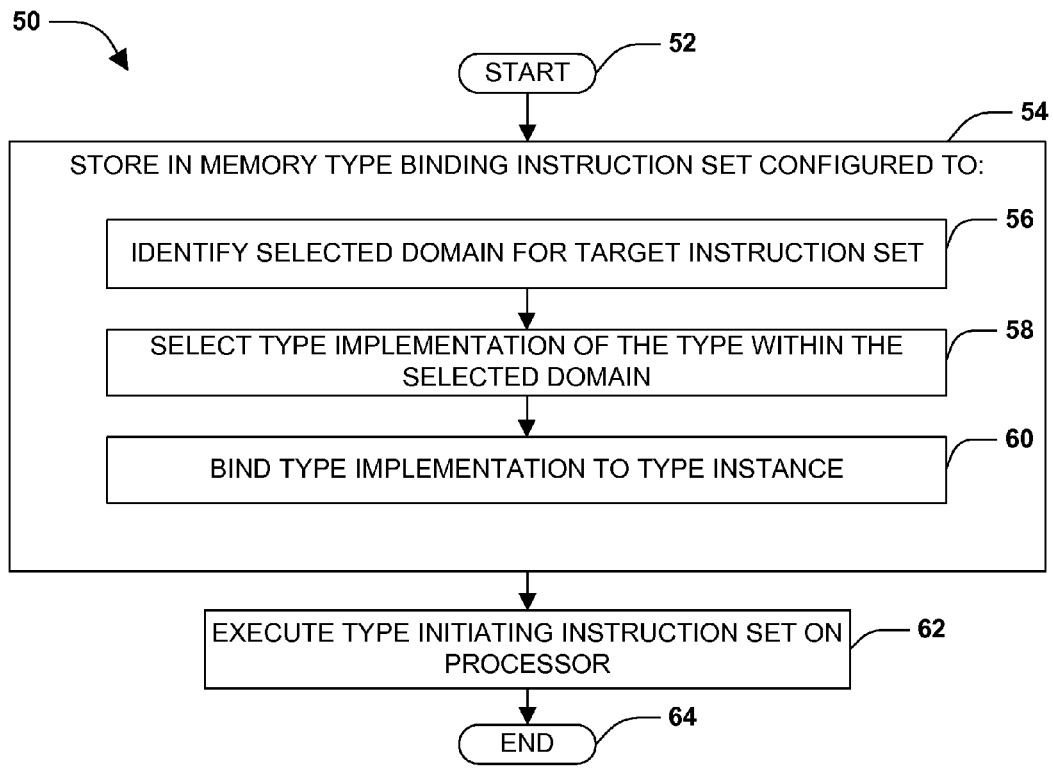
FIG. 3 is a flow chart illustrating an exemplary method of binding a type instance of a type specified in a target instruction set stored in a memory of a computer having a processor and defining at least two domains.

FIG. 3 illustrates a first embodiment of these techniques, represented as an exemplary method 50 of binding a type instance of a type 74 specified in a target instruction set 14 stored in a memory 72 of a computer having a processor 12 and defining at least two domains 76. The exemplary method 50 begins at 52 and involves storing 54 a type binding instruction set 42 in the memory 72, wherein the type binding instruction set 42 is configured to identify 56 a selected domain 76 for the target instruction set 14, to select 58 a type implementation 78 of the type 74 within the selected domain 76, and to bind the type implementation 78 to the type instance of the type 74. The exemplary method 50 also involves executing the type binding instruction set 42 on the processor 12. By storing in the memory 72 of the computer and executing on the processor 12 of the computer a type binding instruction set 42 that binds type instances to the type implementation 78 on behalf of the target instruction set 14 according to the the domain 76 of the target instruction set 14, the exemplary method 50 thereby achieves the domain-specific variant binding of the type 74, and so ends at 64.

Figure 4:
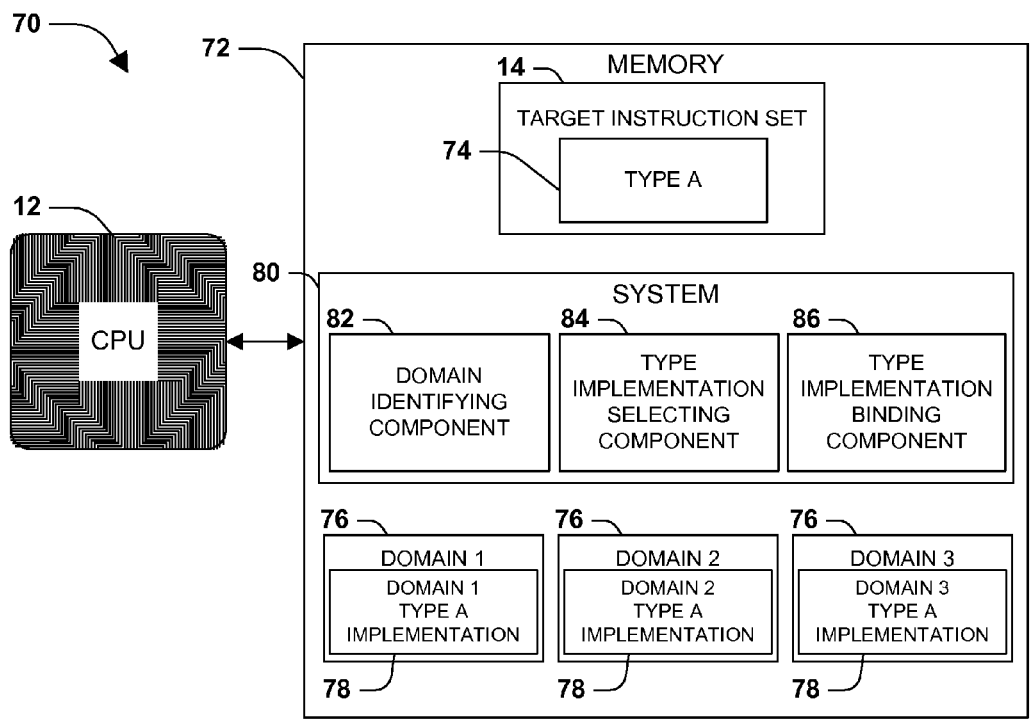
FIG. 4 is a component block diagram illustrating an exemplary system for binding a type instance of a type specified in a target instruction set stored in a memory of a computer having a processor and defining at least two domains.

FIG. 4 illustrates a second embodiment of these techniques, represented as an exemplary system 80 for binding a type instance of a type 74 specified in a target instruction set 14 stored in a memory 72 of a computer having a processor 12 and defining at least two domains 76. The exemplary system 80 may be embodied, e.g., as a type binding instruction set 42 configured, when executed on the processor 12, to bind type instances of the type 74 to particular type implementations 78 on behalf of the target instruction set 14; or a hardware component, such as a field-programmable gate array (FPGA) or a circuit, disposed within the computing environment to facilitate the processing of the target instruction set 14 by the processor 12 by handling the binding of types. The exemplary system 80 comprises a domain identifying component 82, which is configured to identify a domain 76 for the target instruction set 14. The exemplary system 80 also comprises a type implementation selecting component 84, which is configured to select a type implementation 78 for the type 74 specified within the selected domain 76. The exemplary system 80 also comprises a type implementation binding component 86, which is configured to bind the type instances of the type 74 within the target instruction set 14 to the selected type implementation 78. By configuring components for the identification and binding of a domain-specific type implementation of the type 74, the exemplary system 80 thereby facilitates the binding of instances of respective types 74 to particular type implementations within the target instruction set 14 and in view of the current execution domain.

Figure 5:
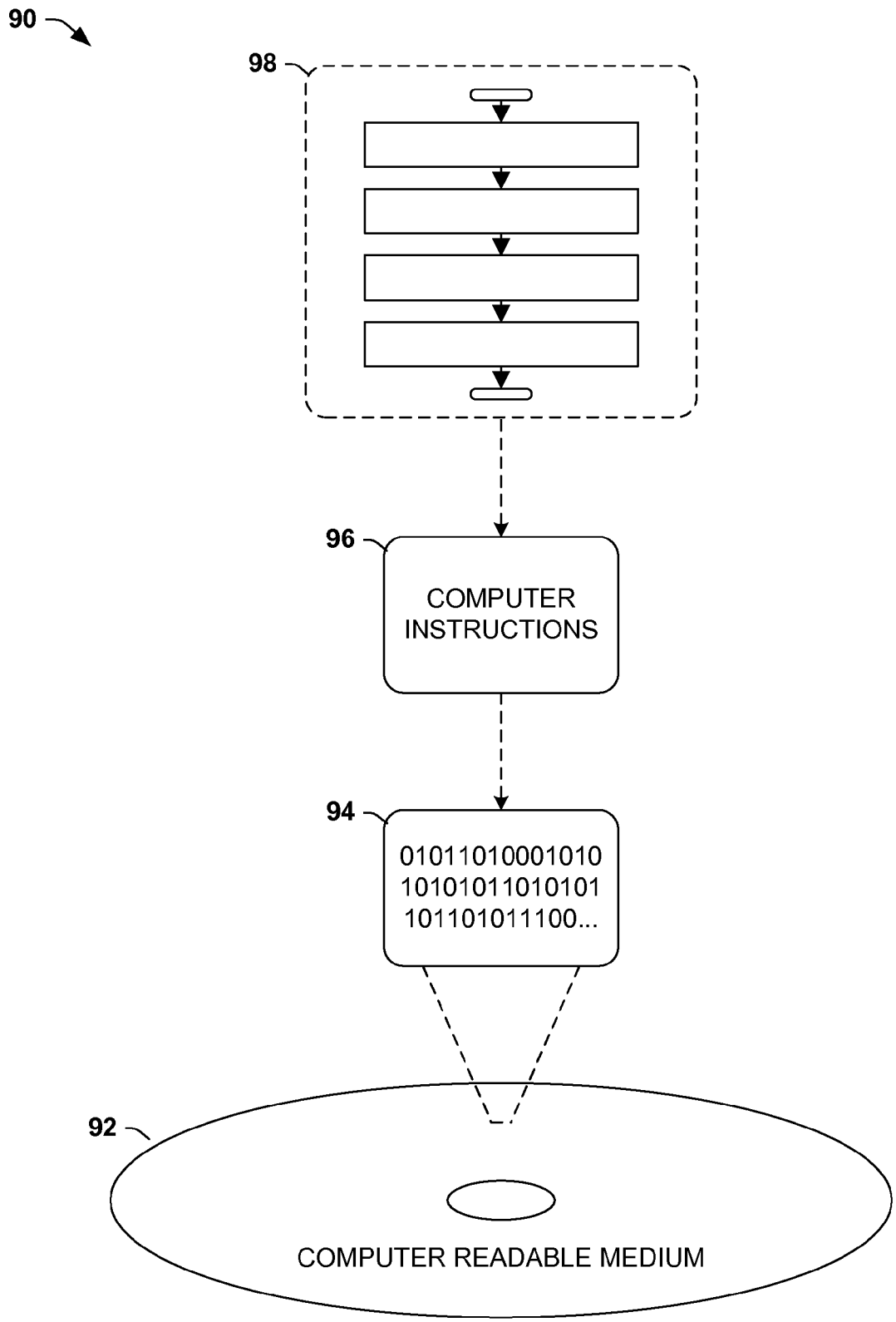
FIG. 5 is an illustration of an exemplary computer-readable medium comprising a type binding instruction set configured to embody one or more of the provisions set forth herein.

Still another embodiment involves a tangible computer-readable medium comprising a type binding instruction set configured to apply the techniques presented herein. An exemplary tangible computer-readable medium that may be devised in these ways is illustrated in FIG. 5, wherein the implementation 90 comprises a computer-readable medium 92 (e.g., a CD-R, DVD-R, or a platter of a hard disk drive), on which is encoded computer-readable data 94. This computer-readable data 94 in turn comprises a set of computer instructions 96 configured to operate according to the principles set forth herein. In one such embodiment, the processor-executable instructions 96 may be configured to perform a method of binding a type instance of a type 74 specified in a target instruction set 14 stored in a memory 72 of a computer having a processor 12 and defining at least two domains 76, such as the exemplary method 50 of FIG. 3. In another such embodiment, the processor-executable instructions 96 may be configured to implement a system for binding a type instance of a type 74 specified in a target instruction set 14 stored in a memory 72 of a computer having a processor 12 and defining at least two domains 76, such as the exemplary system 80 of FIG. 4. Many such tangible computer-readable media may be devised by those of ordinary skill in the art that are configured to operate in accordance with the techniques presented herein.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 50 of FIG. 3 and the exemplary system 80 of FIG. 4) to confer individual and/or synergistic advantages upon such embodiments.

A first aspect that may vary among embodiments of these techniques relates to the nature of types 74 to which the variant instantiation may be applied and the manner of defining such types 74. As a first example, the types 74 may comprise many forms of data utilized in the target instruction set 14, including primitive types (e.g., strings, integers, and Boolean values), data containers (e.g., arrays, linked lists, trees, stacks, and heaps), and data structures comprising an organization of members (e.g., structs, classes, and tuples.) As a second example, a type implementation 78 of a particular type 74 may be defined in many ways, such as an express declaration of structure in the target instruction set 14, a reference to an externally defined structure (e.g., an XML schema defining a class), and a reference to a standard (e.g., formatting an integer according to a native format supported by a native or virtual computing environment.) As a third example, a type implementation 78 of a type 74 may be wholly defined together in the target instruction set 14, or may be defined in multiple locations (e.g., in an aspect-oriented language, a cross-cutting module alters an implementation in another module), or may be defined as an alteration of another type implementation 78 (e.g., a class that inherits from a superclass may specify only the new and altered class members and properties, and a type implementation 78 within a domain 76 may specify only alterations to a base type implementation 78, such as illustrated in FIG. 2.) Those of ordinary skill in the art may apply the techniques discussed herein to many data types of various natures and defined in various ways.

A second aspect that may vary among embodiments of these techniques relates to the different types of bindings of instances of the type 74 to the type implementation 78 within the target instruction set 14. As a first example, the computing environment may bind 60 the type instances of the type 74 to the type implementation 78 during an inspection of the target instruction set 14 when a user requests information about a particular type that depends on the type implementation, and the binding may comprise displaying for the user at least one aspect of the type implementation 78 selected for the type 74 within the selected domain 76. As another example, a process may examine the target instruction set 14 (e.g., to identify security vulnerabilities), a compiler may evaluate the target instruction set 14 in order to compile an executable binary; in these cases, the binding may comprise notifying such processes as to the details of the type implementation 78. As a third example, the binding may be performed during execution of the target instruction set 14 on the processor 12, and the binding may comprise instantiating one or more type instances of the type 74 according to the selected type implementation 78 within the selected domain 76.

Figure 6:
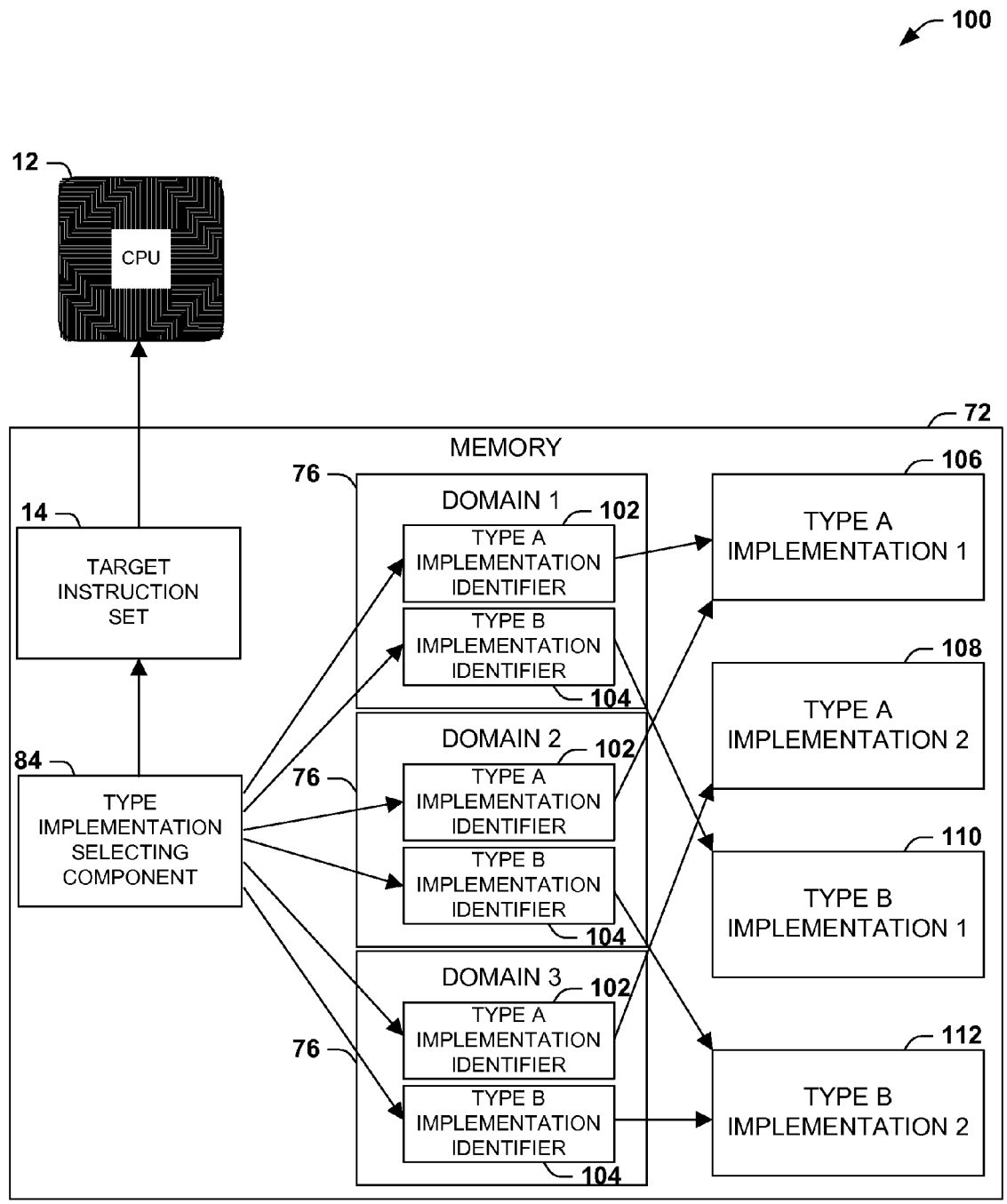
FIG. 6 is an illustration of an exemplary scenario featuring a storing of various type implementation identifiers within various domains.

A third aspect that may vary among embodiments of these techniques relates the manner in which a computing environment may identify 56 a type implementation 78 of a type 74 in the domain 76 for the target instruction set 14. As a first variation of this aspect, respective domains 76 may contain or reference one or more type implementations 78, and a suitable type implementation 78 may be identified by searching the contained or referenced type implementations 78. As a second variation of this third aspect, the domains 76 may be queried for a suitable type implementation 78 of a particular type 74 and may provide a reference to the selected type implementation 78. For example, a domain 76 may comprise a type implementation identifier of a type 74, which may be configured to select the type implementation 74 of the type 78 within the domain 76. FIG. 6 illustrates an exemplary scenario 100 wherein the memory 72 comprises a target instruction set 14 that may execute on a processor 12, a set of domains 76, and a type implementation selecting component 84 that selects a type implementation of the type on behalf of the target instruction set 14. In addition, the memory 72 comprises a set of type implementations, including a first type implementation 106 and a second type implementation 108 for a type identified as "type A," and a third type implementation 110 and a fourth type implementation 112 for a type identified as "type B." The respective domains 76 may include a first type implementation identifier 102 that identifies a type implementation for type A within the domain, and a second type implementation identifier 104 that identifies a type implementation for type B within the domain. The type implementation selecting component 84 may therefore identify a type implementation for type A on behalf of the target instruction set 14 by querying a domain 76 for a type implementation of type A, and the domain 76 may invoke the first type implementation identifier 102 to identify the selected type identifier for type A. This invoking may occur, e.g., upon loading an assembly specifying the type instance (e.g., when the target instruction set 14 is first loaded into the memory 72 for storing or execution, the domains 76 may generate type implementation identifiers for respective types that are instantiated in the target instruction set 14), or upon beginning execution of the target instruction set 14, or upon instantiating the type instance during execution of the target instruction set 14.

Other variations of this third aspect may be used where a suitable type implementation 78 of a particular type 74 is not found in the domain 76. In a third variation of this third aspect, a default type implementation 78 of the type 74 may be identified and used. For example, the target instruction set 14 may include a default type implementation of the type 74 in case the domain 76 does not contain a domain-specific type implementation 78. As another example, a domain 76 may contain a default type implementation 78 to be used for any type 74 that does not have a more specific type implementation 78 in the domain 76. Conversely, the target instruction set 14 may expressly omit a definition of the type implementation 78 of the type 74, such as in a class defined as an "abstract" class that is to be implemented in each domain 76 in which the target instruction set 14 may execute. In a fourth variation of this third aspect, upon failing to identify a type implementation 78 within the selected domain 76, a stub type implementation may be inserted into the selected domain 76. This stub type implementation may comprise a basic implementation with a few generic members (e.g., a newly declared subclass of the generic "object" class), and if the target instruction set 14 references a particular member or aspect of the type implementation 78, a temporary member or aspect may be added to the stub type implementation (e.g., if the target instruction set 14 references a "strName" member of the class, a "strName" member of type string may be added to the class.)

In a fifth variation of this third aspect, the type implementing system or method may attempt to locate a suitable type implementation 78 among the resources of the computing environment. In one such example, the at least one assembly defining the type implementation 78 of the type 74 within the selected domain 76 may be selected, and the type implementation 78 may be retrieved from the assembly. In a "closed" universe of such resources, the at least one assembly may be selected from among a limited assembly set associated with the selected domain 76 (such as a trusted set of assemblies from which type implementations 78 may be identified and used.) In an "open" universe of such resources, any assembly that identifies the type implementation 78 may be utilized; for example, a user selection may be solicited from a user for at least one candidate assembly that defines the type implementation 78 of the type 74, and upon receiving the user selection, the computing environment may identify 56 the type implementation 78 by selecting the assembly specified in the user selection.

Other variations of this aspect may involve various types of compensation upon failing to locate a type implementation 78 of a type 74. For example, the computing environment may fail to instantiate the type (e.g., by returning a null value instead of an object reference for a class that cannot be instantiated), notify a user or process of an error, and/or throw an exception. Those of ordinary skill in the art may devise many techniques whereby a computing environment (such as a type binding instruction set 42) may identify 56 the type implementation 78 of a type 74 while implementing the techniques discussed herein.

A fourth aspect that may vary among embodiments of these techniques involves the manner in which a computing environment may specify a type implementation 78 for one or more type instances of a type 74. In a first variation, the type implementation 78 may comprise a descriptor for the type 74, such as a class definition or a XML schema. The type instance generating component 84 may use the descriptor to compose the type instance of the type 74, e.g., by using a reflection library to add members to an instance of a base class (such as "object"), or by using a memory allocation library to allocate and initialize memory for a primitive type. As a second variation, the type implementation 78 may comprise a type instance generator that is configured to generate instances of a type 74 according to the type implementation 78, and that the type instance generating component 84 may invoke to generate the type instance of the type 74 according to the type implementation 78. This type instance generator may be configured with respect to a particular type, such as a factory method. Alternatively, the generator may be configured to generate instances of two or more types, and may achieve this configuration (e.g.) through the use of a reflection library to compose a type instance of any such type 74 according to the selected type implementation 78.

It may be appreciated that embodiments and variations that use reflection techniques may be comparatively slow, as reflection can be a computationally expensive operation. Therefore, it may be desirable to cache one or more type instances, so that subsequent bindings of type instances of a particular type 74 to a type implementation 78 may occur more quickly than the first binding. For example, the memory may comprise at least one type instance cache, which may be configured to associate at least one type with at least cached one type instance. The type implementation binding component 84 may therefore be configured, upon receiving a request to generate a type instance of a particular type 74 according to a type implementation 78, to first search the type instance cache to identify a cached type instance of the type 74. If a cached type instance of the type 74 is located, the type implementation binding component 84 may simply the cached type instance to bind the type instance to the type implementation. However, upon failing to identify a cached type instance of the type 74, the type implementation binding component 84 may instead generate a type instance (e.g., through the invocation of a type instance generator), and may store the type instance in the type instance cache associated with the type 74, which may facilitate the binding of additional type instances of the type 74 to the type implementation 78. Those of ordinary skill in the art may devise many ways of improving the binding of type instances of particular types 74 to respective type implementations 78 while implementing the techniques discussed herein.

A fifth aspect that may vary among embodiments of these techniques relates to the manner in which a computing environment may store a generated type instance in the memory 72. As a first example, the memory 72 may comprise a type instance cache, and a type instance may be stored in the type instance cache to facilitate the generation of additional instances of the type 74. As a second example, along with the type 74 may be stored a reference to the type implementation 78, which may be useful for identifying the manner by which the type instance of the type 74 was generated. As a third example, along with the type instance of the type 74 may be stored a reference to the domain 76 that generated the type instance. This may be useful, e.g., for identifying the domain that created a particular type instance, which may be helpful during a debugging technique such as a stack trace. Those of ordinary skill in the art may devise many additional variations on the storing of type instances of various types 74 in the memory 72 while implementing the techniques discussed herein.

A sixth aspect that may vary among embodiments of these techniques relates to additional capabilities of the computing environment that with respect to type instances of various types 74 generated according to various type implementations 78 associated with various domains 76. As a first example, the computing environment (e.g., the type binding instruction set 42, or a runtime configured to service the execution of the target instruction set 14) may be configured to convert type instances of a type 72 between a first type implementation 78 associated with a first domain 76 and a second type implementation 78 associated with a second domain 76. This conversion may be useful, e.g., where two processes executing in different domains exchange a type instance (such as an object of a particular class.) In this scenario, the second domain may implicitly depend on the structuring and formatting of the type instance of the type 72 according to its own type implementation 78; e.g., a type instance generated in a debugging execution domain may include debugging information, but a native execution domain may not be properly configured to anticipate or handle such information in type instances of the type 72. Accordingly, upon receiving a request to convert a type instance 72 of the first domain 76 to a type instance 72 structured according to a second type implementation 78 within a second domain 76, the computing environment may be configured to convert the type instance to a second type instance according to the second type implementation 78, and to store the second type instance associated with the second domain 76 in the memory 72. This may be achieved, e.g., through the use of a reflection library that removes members of a class that do not appear in the second type implementation 78, adds members to the class that newly appear in the second type implementation 78, and modifies members of the class that differ between the first type implementation 78 and the second type implementation 78. This might also be achieved, e.g., by serializing the members of the type instance according to the first type implementation 78 of the first domain 76, and deserializing the members of the type instance according to the second type implementation 78 of the second domain 76. For example, the type instance might be serialized in XML according to the Simple Object Access Protocol (SOAP), and then deserialized according to the same protocol, which may permit missing members to be added, omitted members to be dropped from the converted representation, and altered members to be reformatted. It may be appreciated that these converting techniques might be facilitated by storing with respective type instances a reference to the domain 76 that generated the type instance, and/or a reference to the type implementation 78 whereby the type instance of the type 74 was generated.

As a second example, the computing environment may facilitate the comparison of type instances, which may be problematic if such type instances are generated by different type implementations 78 of the type 74 within different domains. For example, a memberwise comparison of a first type instance and a second type instance might incorrectly produce a negative comparison result for identical type instances if the type implementation for one type instance adds some members to the type instance that are unrelated to the comparison (e.g., members representing debugging information; or members representing details of file-storage that are irrelevant once the type has been loaded and instantiated) In order to promote such comparisons, the computing environment or a component therein (e.g., the type binding instruction set 42) may be configured, upon receiving a request to compare two type instances, to compare abstractions of respective members of the type instances to generate a comparison result, and to return the comparison result to fulfill the request. For example, in order to compare a first type instance of a type 72 that is generated according to a first type implementation 78 specifying 32-bit integers and a second type instance of the same type 72 that is generated according to a second type implementation 78 specifying 64-bit integers, a memberwise comparison may be performed that abstracts the comparison of integer members to a standard format (e.g., 64-bit integers), and thereby achieves a logical comparison of the contents of respective members without regard to the particular implementation of various members by different type implementations 78. Those of ordinary skill in the art may devise many techniques for promoting operations involving various type instances generated according to various type implementations 78 on behalf of various domains 76 while implementing the techniques discussed herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 7:
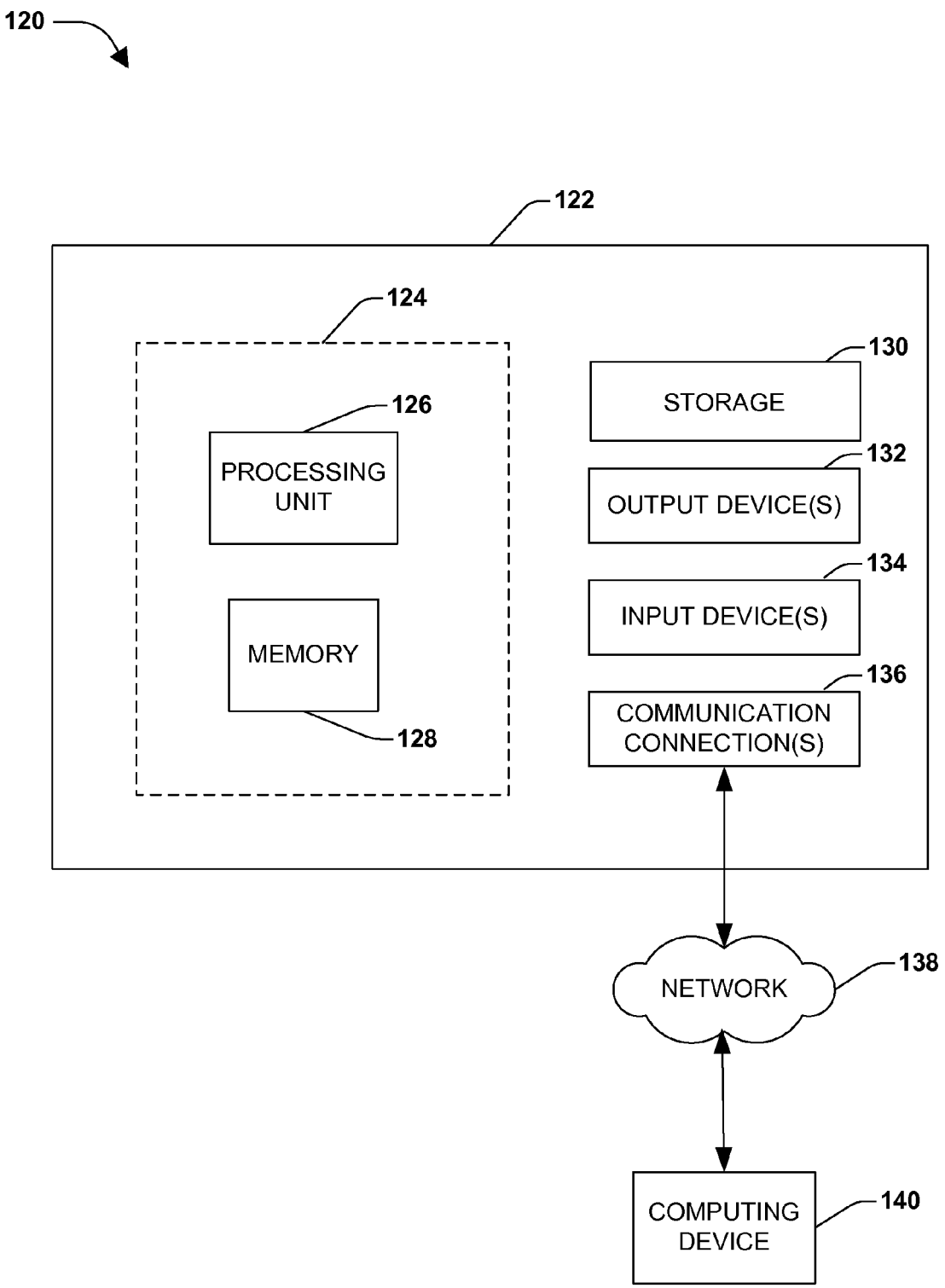
FIG. 7 illustrates an exemplary computing environment wherein one or more of the provisions set forth herein may be implemented.

FIG. 7 and the following discussion provide a brief, general description of a suitable computing environment to implement embodiments of one or more of the provisions set forth herein. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 illustrates an example of a system 120 comprising a computing device 122 configured to implement one or more embodiments provided herein. In one configuration, computing device 122 includes at least one processing unit 126 and memory 128. Depending on the exact configuration and type of computing device, memory 128 may be volatile (such as RAM, for example), non-volatile (such as ROM, flash memory, etc., for example) or some combination of the two. This configuration is illustrated in FIG. 7 by dashed line 124.

In other embodiments, device 122 may include additional features and/or functionality. For example, device 122 may also include additional storage (e.g., removable and/or non-removable) including, but not limited to, magnetic storage, optical storage, and the like. Such additional storage is illustrated in FIG. 7 by storage 130. In one embodiment, computer readable instructions to implement one or more embodiments provided herein may be in storage 130. Storage 130 may also store other computer readable instructions to implement an operating system, an application program, and the like. Computer readable instructions may be loaded in memory 128 for execution by processing unit 126, for example.

The term "computer readable media" as used herein includes computer storage media. Computer storage media includes volatile and nonvolatile, removable and non-removable media implemented in any method or technology for storage of information such as computer readable instructions or other data. Memory 128 and storage 130 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 122. Any such computer storage media may be part of device 122.

Device 122 may also include communication connection(s) 136 that allows device 122 to communicate with other devices. Communication connection(s) 136 may include, but is not limited to, a modem, a Network Interface Card (NIC), an integrated network interface, a radio frequency transmitter/receiver, an infrared port, a USB connection, or other interfaces for connecting computing device 122 to other computing devices. Communication connection(s) 136 may include a wired connection or a wireless connection. Communication connection(s) 136 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 122 may include input device(s) 134 such as keyboard, mouse, pen, voice input device, touch input device, infrared cameras, video input devices, and/or any other input device. Output device(s) 132 such as one or more displays, speakers, printers, and/or any other output device may also be included in device 122. Input device(s) 134 and output device(s) 132 may be connected to device 122 via a wired connection, wireless connection, or any combination thereof. In one embodiment, an input device or an output device from another computing device may be used as input device(s) 134 or output device(s) 132 for computing device 122.

Components of computing device 122 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 122 may be interconnected by a network. For example, memory 128 may be comprised of multiple physical memory units located in different physical locations interconnected by a network.

Those skilled in the art will realize that storage devices utilized to store computer readable instructions may be distributed across a network. For example, a computing device 140 accessible via network 138 may store computer readable instructions to implement one or more embodiments provided herein. Computing device 122 may access computing device 140 and download a part or all of the computer readable instructions for execution. Alternatively, computing device 122 may download pieces of the computer readable instructions, as needed, or some instructions may be executed at computing device 122 and some at computing device 140.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of binding type implementations to types on a computer presenting an environment and having a memory and a processor, the method comprising:

storing in the memory a type binding instruction set configured to, upon receiving a request to execute a target instruction set including at least one type instance of a type:

among at least two execution contexts of an execution context set comprising:

a development execution context;

a compiling execution context;

a runtime execution context; and a debugging execution context, the respective execution contexts associated with at least one characteristic of the environment of the computer in which the target instruction set is to be executed, identify a selected execution context for the target instruction set according to the at least one characteristic of the environment of the computer:

select a selected type implementation that implements the type according to the at least one characteristic of the environment associated with the selected execution context; and bind the selected type implementation to the at least one type instance of the type in the target instruction set; and executing the type binding instruction set on the processor.

2. The method of claim 1:

the binding performed during inspection of the target instruction set by a user, and the binding comprising: displaying for the user at least one aspect of the selected type implementation within the selected execution context.

3. The method of claim 1:

the binding performed during execution of the target instruction set on the processor, and the binding comprising: instantiating the respective type instances according to the selected type implementation of the type within the selected execution context.

4. The method of claim 3, the binding performed during one of:

loading the target instruction set that references the type;

beginning execution of the target instruction set; and instantiating the type instance during execution of the target instruction set.

5. The method of claim 3, the type binding instruction set configured to:

upon receiving a request to compare the type instance with a second type instance of the type generated according to a second type implementation in a second execution context:

compare abstractions of respective members of the type instance with abstractions of corresponding respective members of the second type instance to generate a comparison result, and return the comparison result to fulfill the request.

6. The method of claim 1, selecting the selected type implementation of the type within the selected execution context comprising: upon failing to identify a selected type implementation within the selected execution context, generating a stub type implementation within the selected execution context.

7. The method of claim 1, selecting the selected type implementation of the type within the selected execution context comprising:
selecting at least one assembly defining the selected type implementation of the type within the selected execution context, and
retrieving the selected type implementation from the assembly.

8. The method of claim 7, the at least one assembly selected from among a limited assembly set associated with the selected execution context.

9. The method of claim 7, selecting the at least one assembly comprising:
soliciting a user selection of at least one candidate assembly defining the type implementation of the type; and
upon receiving the user selection, selecting the assembly specified in the user selection.

10. The method of claim 1, the type binding instruction set configured to:
upon receiving a request to convert a selected type instance of the selected execution context to a selected type instance according to a second type implementation within a second execution context:
convert the selected type instance to a second type instance according to the second type implementation, and
store the second type instance associated with the second execution context in the memory.

11. The method of claim 10, the converting comprising:
serializing respective members of the type instance according to the selected type implementation of the selected execution context, and
deserializing the respective members of the type instance according to the second type implementation of the second execution context to generate the second type instance.

12. The method of claim 1:
the memory associating with at least one execution context a type instance binder configured to bind the selected type implementation of the type to type instances within the execution context; and
the binding comprising: invoking the type instance binder with the selected type implementation of the type to bind the selected type implementation to the type.

13. The method of claim 12:
the memory comprising at least one type instance cache associating types with cached one type instances generated according to the selected type implementation of the types within the selected execution context; and
the binding comprising:
searching the type instance cache to identify a cached type instance of the type;
upon identifying a cached type instance of the type, cloning the cached type instance to generate the type instance; and
upon failing to identify a cached type instance of the type:
generating a type instance according to the selected type implementation within the selected execution context, and
storing the type instance in the type instance cache associated with the type.

14. A system for binding type implementations to types specified in a target instruction set within an environment of a computer having a processor, the system comprising:
an execution context identifying component configured to, upon receiving a request to execute a target instruction set including at least one type instance of a type, among at least two execution contexts of an execution context set comprising:
a development execution context;
a compiling execution context;
a runtime execution context; and
a debugging execution context,
the respective execution contexts associated with at least one characteristic of the environment of the computer in which the target respectively associated with at least one characteristic of the environment of the computer, identify a selected execution context for the target instruction set according to the at least one characteristic of the environment of the computer;
a type implementation selecting component configured to select a selected type implementation that implements the type according to the at least one characteristic of the environment associated with the selected execution context; and
a type implementation binding component configured to bind the selected type implementation to the at least one type instance of the type in the target instruction set.

15. The system of claim 14, comprising:
a type instance converting component configured, upon receiving a request to convert the type instance of the selected execution context to a type instance according to a second type implementation within a second execution context, to:
convert the type instance to a second type instance according to the second type implementation, and
store the second type instance associated with the second execution context in the memory.

16. The system of claim 14, comprising:
a type instance comparing component configured, upon receiving a request to compare the type instance with a second type instance of the type generated according to a second type implementation in a second execution context, to:
compare abstractions of respective members of the type instance with abstractions of respective members of the second type instance to generate a comparison result, and
return the comparison result to fulfill the request.

17. The system of claim 14:
the system comprising: at least one execution context comprising a type instance binder configured to bind the selected type implementation of the type to type instances within the execution context; and
the type instance binding component configured to invoke the type instance binder with the selected type implementation of the type to bind the selected type implementation of the type to the type instances.

18. The system of claim 17:
the system comprising a type instance cache associating at least one type with at least cached one type instance generated according to the selected type implementation of the type within the selected execution context; and
the type instance generating component configured to:
search the type instance cache to identify a cached type instance of the type;

upon identifying the cached type instance of the type, clone the cached type instance to generate the type instance; and upon failing to identify a cached type instance of the type:
generate a type instance according to the selected type implementation within the selected execution context, and
store the type instance in the type instance cache associated with the type.

19. The system of claim 14, the type implementation selecting component configured to select the selected type implementation of the type within the selected execution context by:
selecting at least one assembly defining the selected type implementation of the type within the selected execution context, and
retrieving the selected type implementation from the assembly.

20. A nonvolatile computer-readable memory device storing a type binding instruction set configured to, when executed within an environment of a computer having a processor and a memory storing a target instruction set and defining at least two execution contexts, bind type implementations to types specified in the target instruction set by, upon receiving a request to execute a target instruction set having at least one type instance of a type:
among at least two execution contexts of an execution context set comprising:
a development execution context;
a compiling execution context;
a runtime execution context; and
a debugging execution context,
the respective execution contexts associated with at least one characteristic of the environment of the computer in which the target respectively associated with at least one characteristic of the environment of the computer, identifying a selected execution context for the target instruction set according to the at least one characteristic of the environment of the computer;
selecting a selected type implementation that implements the type according to the at least one characteristic of the environment associated with the selected execution context; and
binding the selected type implementation to the at least one type instance of the type in the target instruction set.

* * * * *